US012811949B2

(12) United States Patent
Carru et al.

(10) Patent No.: US 12,811,949 B2
(45) Date of Patent: Nov. 24, 2026

(54) APPLICATION SPECIFICATIONS

(71) Applicant: Snowflake Inc., Bozeman, MT (US)

(72) Inventors: Damien Carru, New York, NY (US); Scott C. Gray, Richmond Hill (CA); Dinesh Chandrakant Kulkarni, Sammamish, WA (US); Maneet Taneja, Nobleton (CA)

(73) Assignee: Snowflake Inc., Bozeman, MT (US)

( * ) Notice: Subject to any disclaimer, the term of this patent is extended or adjusted under 35 U.S.C. 154(b) by 145 days.

(21) Appl. No.: 18/989,225

(22) Filed: Dec. 20, 2024

(65) Prior Publication Data

US 2026/0180992 A1 Jun. 25, 2026

(51) Int. Cl.
*H04L 9/40* (2022.01)
*G06F 8/61* (2018.01)

(52) U.S. Cl.
CPC .............. *H04L 63/105* (2013.01); *G06F 8/61* (2013.01)

(58) Field of Classification Search
CPC ................................ H04L 63/105; G06F 8/61
See application file for complete search history.

(56) References Cited

U.S. PATENT DOCUMENTS 11,803,432 B1 * 10/2023 Avanes ............... G06F 16/2456
2024/0388584 A1 * 11/2024 Carru .................... H04L 63/102

* cited by examiner

*Primary Examiner* — Baotran N To
(74) *Attorney, Agent, or Firm* — Schwegman Lundberg & Woessner, P.A.

(57) ABSTRACT

Application specification objects may be created by an application and are visible to consumer administrators with appropriate privileges. An application may be configured to create of one or more sensitive objects, which may expose the customer of the application to risk. Application specifications reduce friction in that the customer does not need to take the steps to create these sensitive objects. The application may create the objects directly, but the customer may instead just review and approve the use of those objects.

30 Claims, 9 Drawing Sheets t1

<!-- Application -->
Create Or Alter Application Specification Foo ..

| name | type | seq_num | status | defintition |
|---|---|---|---|---|
| Foo | External Access | 1 | Pending | host_ports: ['v1'] |

t2

<!-- Consumer -->
Alter Application <app> Modify Application Specification Foo In Application App Approve sequence _number 1;

| name | type | seq_num | status | defintition |
|---|---|---|---|---|
| Foo | External Access | 1 | Approved | host_ports: ['v1'] |

t3

<!-- Application -->
Create Or Alter Application Specification Foo ..

| name | type | seq_num | status | defintition |
|---|---|---|---|---|
| Foo | External Access | 1 | Approved | Host_ports: ['v1'] |
| Foo | External Access | 2 | Pending | Host_ports: ['v2'] |

t4

<!-- Application -->
Create Or Alter Application Specification Foo ..

| name | type | seq_num | status | defintition |
|---|---|---|---|---|
| Foo | External Access | 1 | Approved | Host_ports: ['v1'] |
| Foo | External Access | 3 | Pending | Host_ports: ['v3'] |

FIG. 7A t5

<!-- Consumer -->
Alter Application <app> Alter Application Specification Foo
In Application App
Decline Sequence_number 1;

| name | type | seq_num | status | defintition |
|---|---|---|---|---|
| Foo | External Access | 1 | Declined | Host_ports: ['v1'] |
| Foo | External Access | 3 | Pending | Host_ports: ['v3'] |

t6

<!-- Application -->
Create Or Alter Application Specification Foo ..

| Name | Type | Seq_num | Status | Defintition |
|---|---|---|---|---|
| Foo | External Access | 4 | Pending | Host_ports: ['v4'] |

t7

<!-- Application -->
Create Or Alter Application Specification Foo ..

| Name | Type | Seq_num | Status | Defintition |
|---|---|---|---|---|
| Foo | External Access | 5 | Pending | Host_ports: ['v5'] |

t8

<!-- Consumer --> t8
Alter Application <app> Modify Application Specification Foo
In Application App
Approve Sequence_number 5;

| Name | Type | Seq_num | Status | Defintition |
|---|---|---|---|---|
| Foo | External Access | 5 | Approved | Host_ports: ['v5'] |

FIG. 7B

APPLICATION SPECIFICATIONS

TECHNICAL FIELD

Embodiments of the disclosure relate generally to cloud data platforms and, more specifically, to interfaces for applications in a shared data platform.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

A data platform may include one or more databases that are respectively maintained in association with any number of customer accounts. It may occur from time to time that users associated with two different customer accounts wish to interact. It can be challenging, however, to do so in a secure and scalable manner.

BRIEF DESCRIPTION OF THE DRAWINGS

The present disclosure will be understood more fully from the detailed description given below and from the accompanying drawings of various embodiments of the disclosure.

FIGS. 7A-7B show an example portion of a lifecycle of an application specification, according to some example embodiments.

DETAILED DESCRIPTION

Figure 1:
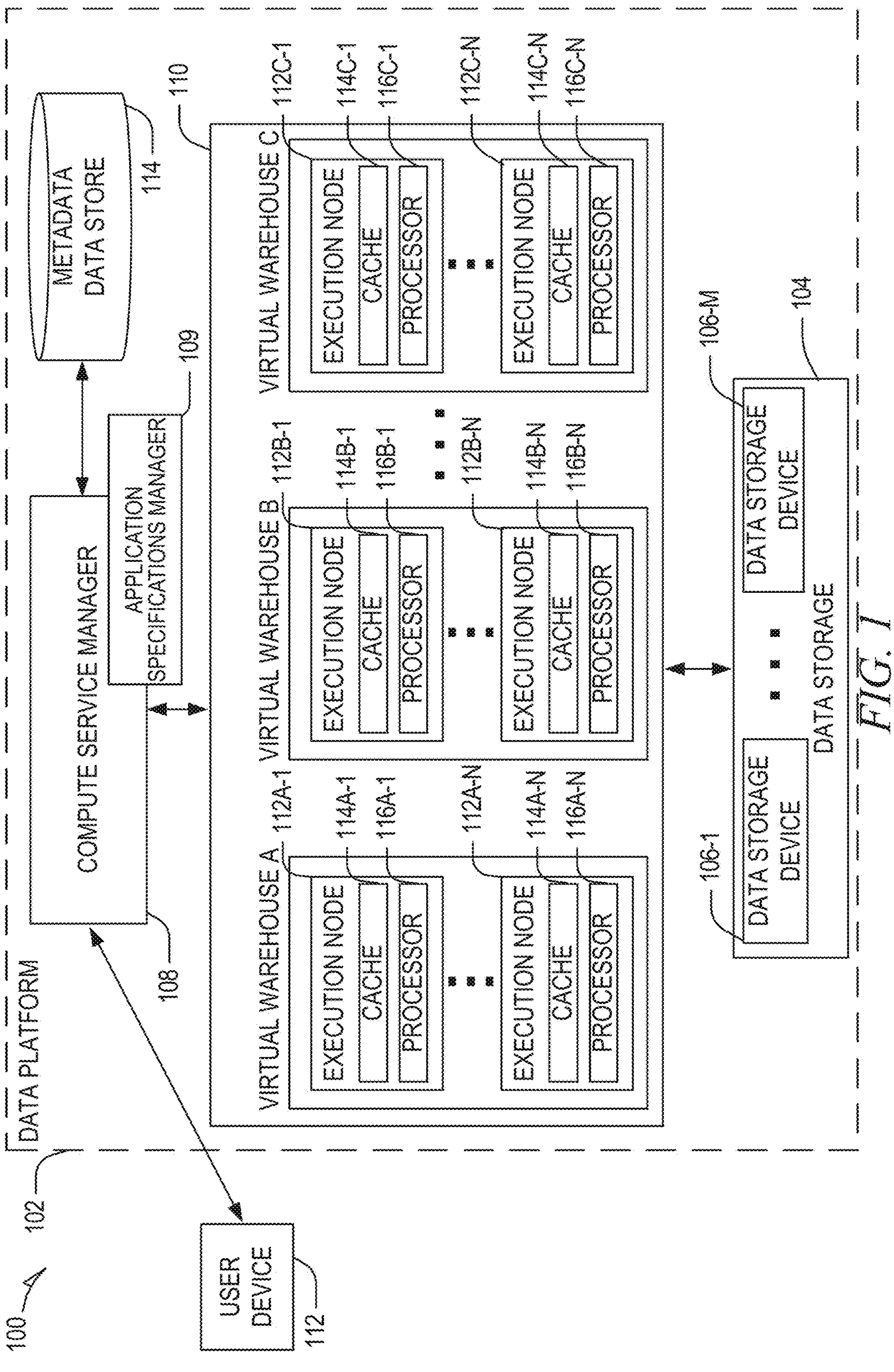
FIG. 1 illustrates an example computing environment that includes a cloud data platform, according to some example embodiments.

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

A data platform (or cloud data platform), as described in further detail below may include a plurality of different accounts. In some cases, a provider account can create an application. In some embodiments, the application may be what is referred to in the present disclosure as a "native platform application" or "native application," which, as used herein, refers to an application that is "built in" to—i.e., executes on—the herein-described data platform.

The provider account can share the application with one or more consumer accounts. In some of the described examples, both the data providers and the data consumers are customers of a common data platform, and accordingly each have a respective customer account (or just "account") on that data platform. In other embodiments, a given data provider and a given data consumer operate on separate platforms. Either or both of the separate platforms could be platforms operated by the data provider or data consumer themselves, or could be a customer account held by the data provider or the data consumer on another multi-customer data platform.

In some example embodiments, a given application may reside in the data-platform account of a provider account, and may include a set of application programming interfaces (APIs) that are associated with various underlying blocks of (e.g., source and/or executable) code provided by the given application. The underlying code blocks may perform operations that include, but are not limited to, particular queries, particular query operations (e.g., joins), user-defined functions, other functions, stored procedures, scripts, user-interface elements, secure views, and/or the like. In some examples, the provider account may share certain data with the application.

The provider account may further permit one or more consumer accounts to install an instance of the application. It is noted that there may be multiple data providers, multiple applications provided by a given data provider, multiple data consumers, multiple application instances installed by a given data consumer, and so forth. For simplicity, however, most of the examples that are described in the present disclosure involve a single data provider that has created a single application in the provider account, and a single consumer account that installs a single instance of that application in the consumer account.

Application specifications can reduce the friction in consumer configuration experience. For example, application specifications allow applications to create and manage egress objects while still honoring the egress policy of the consumer. An application specification is an interface via which an application can describe its compute and/or security requirements. An application specification can be static or dynamic. Static specifications may be known at application install or upgrade time. Dynamic specifications may be identified post setup script execution, for example, based on consumer input. Specifications can be for required or optional functionality. For example, some specifications may be necessary for an application to function while some specifications may be used for optional features of an application.

Application specification objects may be created by an application and are visible to consumer administrators with appropriate privileges (e.g., consumer administrator). An application may be configured to create one or more sensitive objects (also referred to as account-level objects), which may expose the customer of the application to risk. For example, an object that controls the ability to egress the account risks data exfiltration of the customer. Application specifications reduce friction in that the customer does not need to take the steps to create these sensitive objects. The application may create the objects directly, but the customer may instead just review and approve the use of those objects. Each specification may include a request from an application to the consumer, such as an egress request. With the use of application specification objects, an application can freely create account-level objects, such as external access integration. However, these account-level objects may not be usable until the corresponding specifications are approved by the consumer.

Moreover, application specifications can provide a simpler interface for the customers in terms of seeking approval. For example, for egress, the customer may only need to review the egress locations (say, hosts and ports), but does not need to be exposed to other non-sensitive, configuration details such as connection lifetime. Hence, the request may be simply shaped as a "Egress to a list of host ports."

FIG. 1 illustrates an example computing environment 100 that includes a cloud data platform 102, according to some example embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata data store 113, an execution platform 110, and data storage 104. The cloud data platform 102 hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources including storage devices within the data storage 104. The data storage 104 comprises a plurality of computing machines and provides on-demand computer system resources such as data storage and computing power to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

As shown, the compute service manager 108 includes an application specification manager 109 that is responsible for managing specification objects for a respective application. Further details of the operation of the application specification manager 109 are discussed below.

The compute service manager 108 is also in communication with a user device 112. The user device 112 corresponds to a user of one of the multiple client accounts supported by the cloud data platform 102. In some implementations, the compute service manager 108 does not receive any direct communications from the user device 112 and only receives communications concerning jobs from a queue within the cloud data platform 102.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution nodes 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems (HDFS)), object storage systems, and the like. In some examples, the storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 1. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 1 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage devices 106-1 to 106-M are decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 113 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata data store 113, execution platform 110, and data storage 104 are shown in FIG. 1 as individual discrete components. However, each of the compute service manager 108, metadata data store 113, execution platform 110, and data storage 104 may be implemented as a distributed system (e.g., distributed across multiple systems/platforms at multiple geographic locations). Additionally, each of the compute service manager 108, metadata data store 113, execution platform 110, and data storage 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from, and store data to, any of the data storage resources in the data storage 104.

Figure 2:
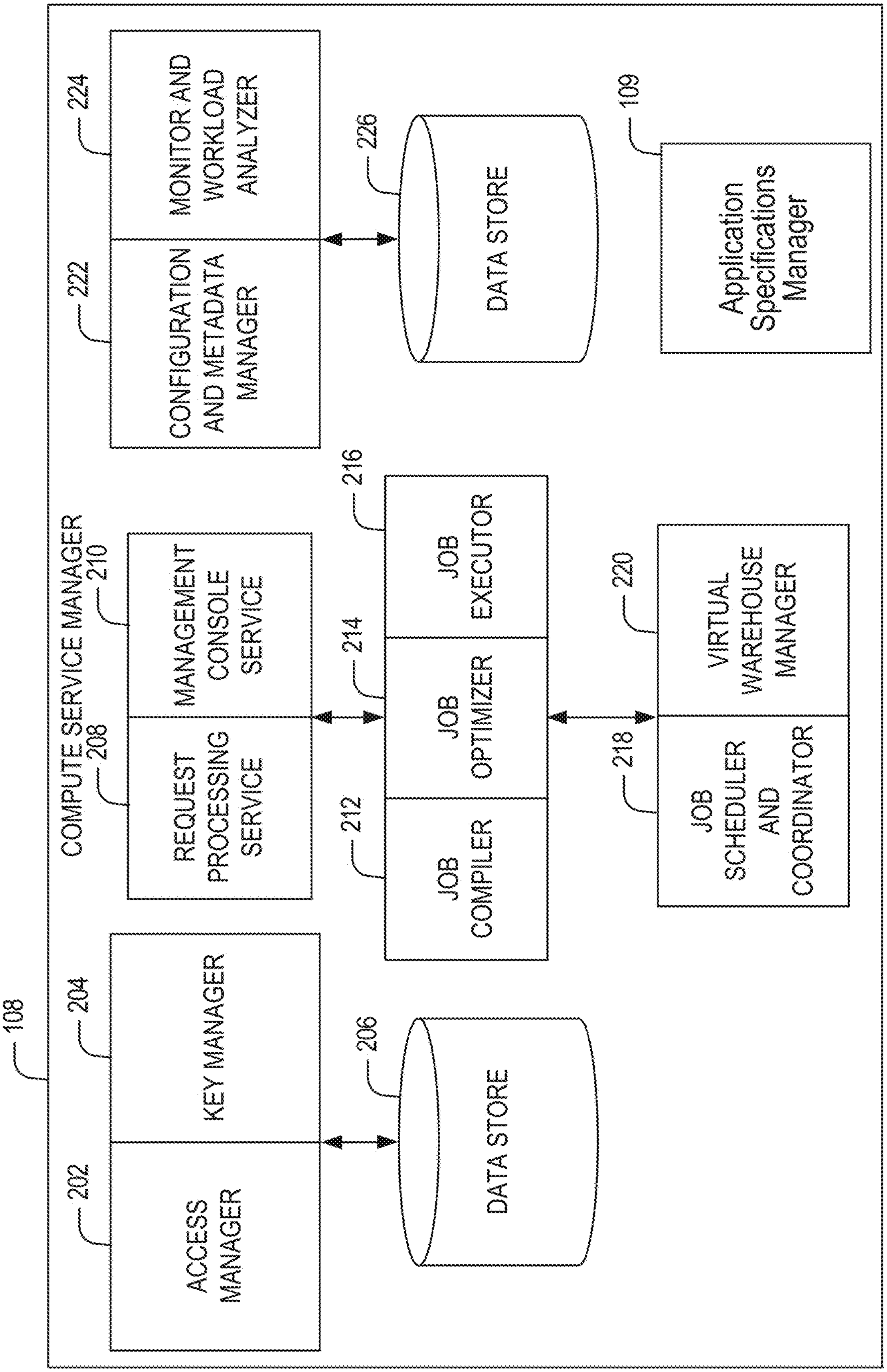
FIG. 2 is a block diagram illustrating components of a compute service manager of the cloud data platform, according to some example embodiments.

FIG. 2 is a block diagram illustrating components of the compute service manager 108, according to some example embodiments. As shown in FIG. 2, the compute service manager 108 includes an access manager 202 and a key manager 204 coupled to a data store 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the cloud data platform 102. For example, data store 226 may represent caches in execution platform 110, storage devices in data storage 104, the metadata data store 113, or any other storage device or system.

In addition, as mentioned above, the compute service manager 108 includes an application specification manager 109 that is responsible for managing specification objects for a respective application. Further details of the operation of the application specification manager 109 are discussed below.

Figure 3:
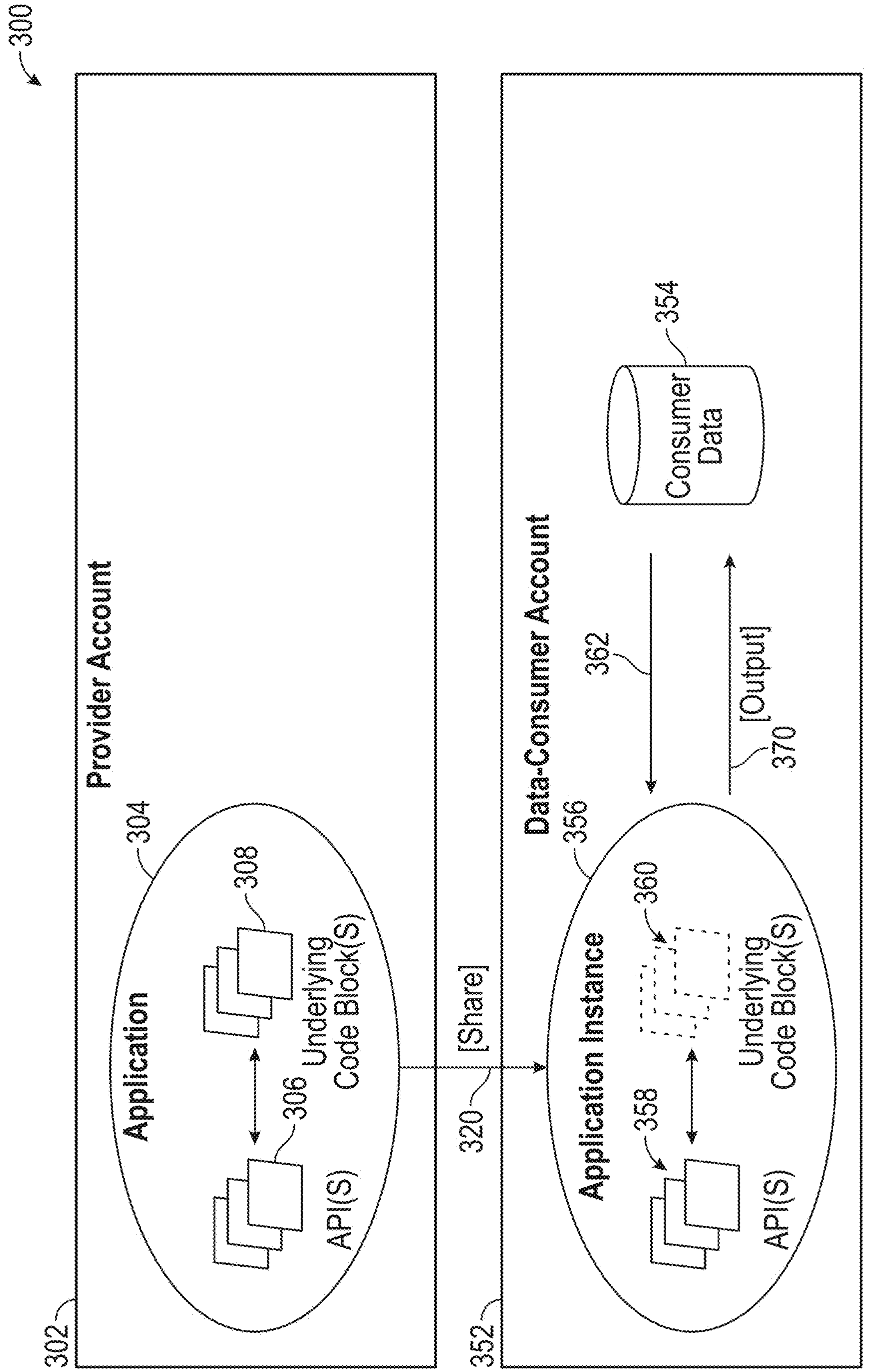
FIG. 3 depicts an example of a framework for providing and sharing an application, according to some example embodiments.

FIG. 3 depicts an example of a framework 300 for providing and sharing an application, according to some example embodiments. A provider account 302 generates and provides an application 304 (e.g., native application). The provider account 302 may also include provider data (not shown), such as one or more tables. The application 304 includes one or more APIs 306 that correspond with one or more respective underlying code blocks 308. The APIs 306 and associated underlying code blocks 308 may provide any of the operations described above, including queries, query operations (e.g., joins), user-defined functions, stored procedures, access to one or more secure views, generation of one or more user-interface elements, and/or the like. In some embodiments, the underlying code blocks 308 may contain the source code and/or executable code that performs the operations accessible via the APIs 306.

A share 320 depicts that the provider account 302 is sharing the application 304 with a consumer account 352. In some embodiments, sharing involves permitting the installation in the consumer account 352 of an application instance 356 of the application 304. The application instance 356 includes one or more APIs 358 that correspond to the one or more APIs 306 of the application 304. The APIs 358 respectively provide access to one or more underlying code blocks 360, which correspond to the one or more underlying code blocks 308 in the application 304. Whereas the underlying code blocks 308 (e.g., the underlying source code and/or executable code) are visible to the provider account 302, the underlying code blocks 360 are not visible to the consumer account 352—for this reason, the underlying code blocks 360 are depicted using dashed outlines in FIG. 3.

The consumer account 352 also contains consumer data 354. In some embodiments, the consumer account 352 may grant access to at least some of the consumer data 354 with the application instance 356. When the consumer account 352 uses one or more of the APIs 358 of the application instance 356, any output of these operations is depicted as being stored in the consumer data 354 of the data-consumer account 352. The security of the consumer data 354 is protected in at least two ways: the consumer data 354 stays in the consumer account 352 and is not exposed to the provider account 302, and the resulting output 370 is locally stored in the consumer account 352 and also not exposed to the provider account 302.

However, some applications may need to configure or access sensitive resources that have the potential to introduce risk to the consumer account. For example, an application may be configured to egress data outside of the consumer account in which the application has been installed. But applications typically cannot create these types of account-level objects that can potentially introduce risk, such as External Access Integration (EAI) and Security Integration (SI), due to security model concerns. Such account-level objects can allow egress, and consumer action is typically needed to allow the egress each time. This can lead to multiple back-and-forth communications between an application and a consumer administrator to create and update these objects. This can put the burden on the consumer of creating and updating these objects. Moreover, this back-and-forth may also bleed the internal details of the application object to the consumer.

Access to and by applications may be governed by privileges. Application privileges may include different types of privileges. Some privileges may be related to compute resource usage, which can affect the cost of the customer. For example, these resource cost control type privileges may include privileges to execute task, create warehouse, create compute pool, create database, and similar examples of privileges related to the creation or access to compute resources. These resource cost control type privileges may be granted automatically at install time of the application to allow the application to be running and accessible as soon as the installation is completed. In some embodiments, these privileges may be displayed by the application to the consumer before being granted.

Security type privileges may be related to security risks, such as egress privileges. Security type privileges may be gated by application specifications, as described in further detail below. As explained below, security type privileges may be automatically granted at install time; however, the objects that the application creates are not functional until they are given approval by the consumer because the security type privileges may present security risks. The objects are gated by the application specifications such that while the objects can be created, they are effectively non-functional until an application specification has been approved by the consumer to enable them. This simplifies the process of creating such an application because the application no longer needs to make the installation/creation of certain objects contingent upon receiving a privilege. The application may simply install everything it needs and may only delay using the features until the corresponding specification is approved. Examples of security type privileges may include creating external access integration, API integration, security integration, share integration, and the like.

Application specifications can reduce the friction in consumer configuration experience. For example, application specifications allow applications to create and manage egress objects while still honoring the egress policy of the consumer. An application specification is an interface via which an application can describe its compute and, security, or other requirements. An application specification can be static or dynamic. Static specifications may be known at application install or upgrade time. Dynamic specifications may be identified post setup script execution, for example, based on consumer input. Specifications can be for required or optional functionality. For example, some specifications may be necessary for an application to function while some specifications may be used for optional features of an application.

Application specification objects may be created by an application and are visible to consumer administrators with appropriate privileges (e.g., consumer administrator). Each specification may include a request from an application to the consumer. For example, the request may be shaped based on the type of authorization requested, such as a "Egress to a list of host ports." With the use of application specification objects, an application can freely create account-level objects, such as EAI or SI. However, these account-level object may not be usable until the corresponding specifications are approved by the consumer. For example, the system can capture whether account-level objects, such as EAI or SI, was created by an application (as opposed to by the consumer account). If the account-level object was created by the application, the system can compare the list of allowed endpoint values against the approved specifications. The approved endpoints may be allowed to be made accessible via the account-level object.

Figure 4:
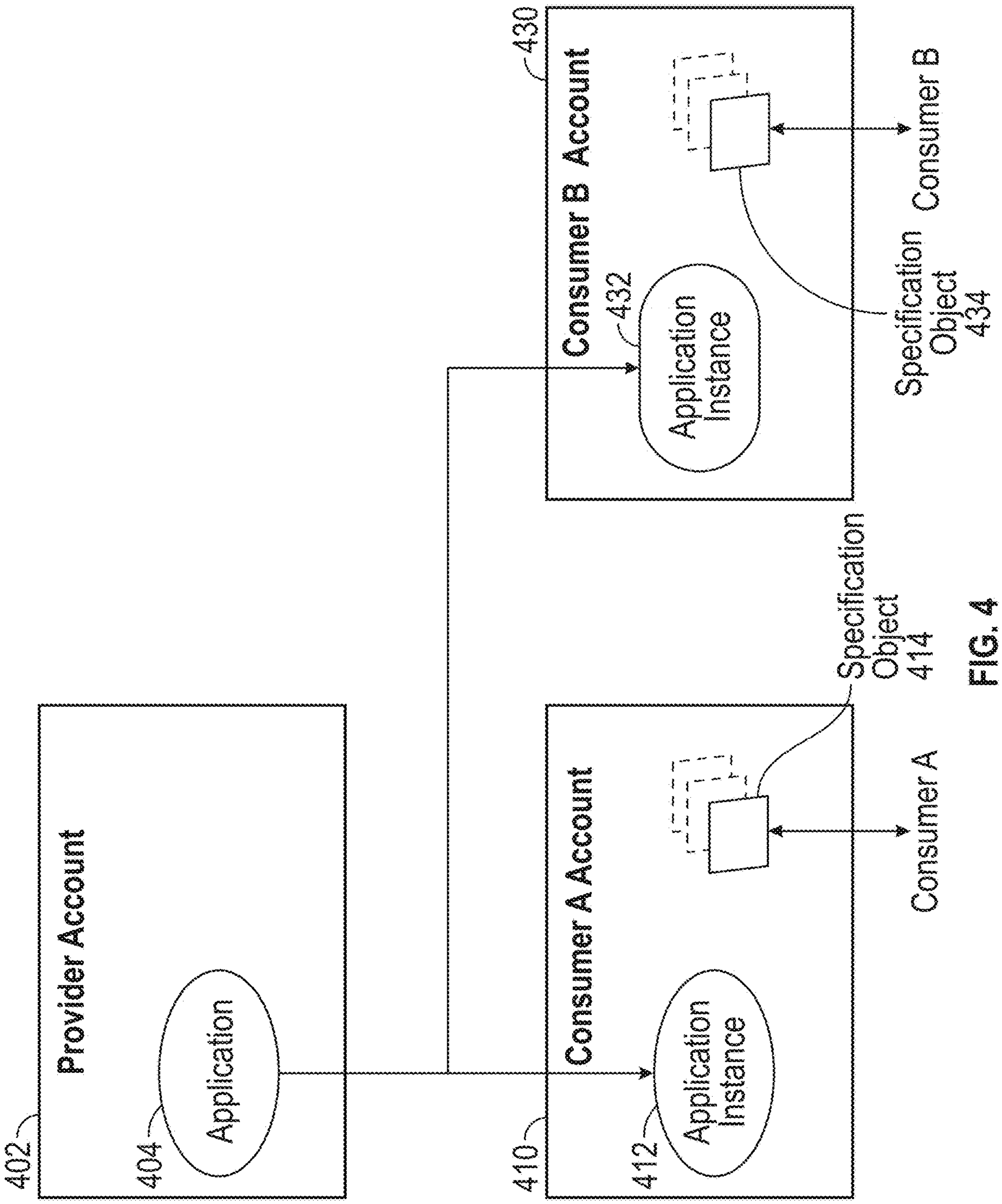
FIG. 4 depicts an example of a framework for providing specification objects for applications, according to some example embodiments.

FIG. 4 depicts an example of a framework 400 for providing specification objects for applications, according to some example embodiments. A provider account 402 generates and provides an application 404 (e.g., native application). The provider account 402 may share the application 404 with a plurality of consumers, such as consumer A account 410 and consumer B account 420, as described above.

Consumer A account 410 may install an application instance 412 (also referred to as application 412) of the application 404 from the provider account 402. The application 412 may create one or more specification objects 414 within application 412 in the consumer A account 410. Each specification object 414 may include a privilege request from the application 412 to consumer A. For example, each specification object 414 may include a request from the application 412 to consumer A defining a security approval for some form of external connection for the application 412 to use. The specification object 414 may describe an external location that the application 412 will access, an account or an organization that the application will share data with, etc.

Likewise, Consumer B account 430 may install an application instance 432 (also referred to as application 432) of the application 404 from the provider account 402. The application 432 may create one or more specification objects 434 within application 432 in the consumer B account 430. Each specification object 434 may include a privilege request from the application 432 to consumer B.

Application specifications may be of different types. For example, EAI may be an application specification type that details host ports that an application to which an application connects. Approval of EAI specification type allows the application to use the associated EAI. API integration may an application specification type that details the API prefix for an API integration. Approval of this application specification type allows the application to use the association API integration. Data sharing allows an application to create and manage a logical view of data in the consumer's account that may be shared back for the provider's use or to other accounts. Approval of this application specification type allows the consumer to review and approve or decline the target accounts to which the data is shared. In some examples, a specification type may be related to different types of account level objects. For example, a specification type could be a general approval to communicate data to an account. This communication could take place via a number of different object types, such as accessing a remote file-system (stage), sharing tables, etc.

Specification objects may include a plurality of fields. The fields may include a name of the application specification, type of the application specification, label to be displayed to consumer, description of the application specification, and definition specific to the application specification type. In some embodiments, an optional field may be included to indicate whether the application specification is required for the application to operate or an optional feature.

Specification objects may also include a status field that is populated based on consumer and application actions. For example, the status field may have three possible values: pending, approved, and declined. Pending status indicates that the application specification has been requested by the application, but the consumer has yet to act on it. Approved status indicates that the consumer has approved the application specification, and the application specification is in effect. Declined status indicates that the consumer has declined the specification.

Specification objects may also include sequence number field. As discussed in further detail below, an application specification may be altered, and each new version may produce a new incremental value for the sequence number. The sequence number may be used to identify each request sequence/version and avoid race conditions. As described in further detail below, the sequence number is provided when the consumer approves or declines the specification. By providing the sequence number during this operation, it ensures that the consumer is approving or declining what the consumer reviewed and not accidentally approving changes the application made since the consumer started reviewing.

Figure 5:
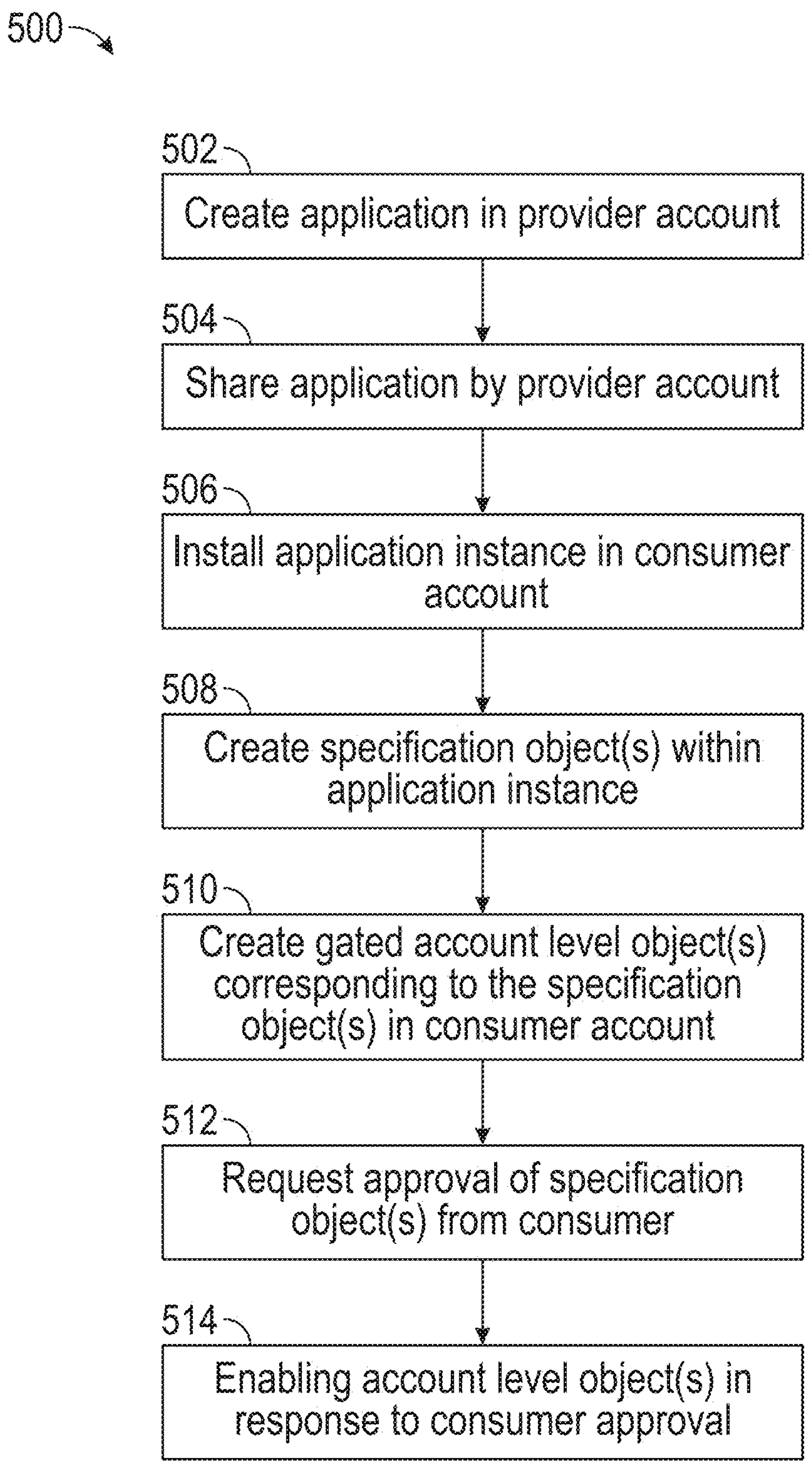
FIG. 5 shows a flow diagram of a method for providing an application using an application specification, according to some example embodiments.

FIG. 5 shows a flow diagram of a method 500 for providing an application using an application specification, according to some example embodiments. The example method 500 is described by way of example as being performed by the data platform 102 (see FIGS. 1-4), though this is by way of example and not limitation. The method 500 could be performed by any one or more computing devices that are suitably programmed to perform the described functions.

At operation 502, a provider account in the data platform creates an application. As described above, the application may include one or more APIs corresponding to one or more underlying code blocks. The application may also include one or more security type privileges that are gated by application specifications, as described above. For example, the application may include one or more of EAI, API integration, security integration, share integration, and the like.

At operation 504, the provider account shares the application with one or more consumer accounts. For example, the provider account may publish the application in an application store provided by the data platform.

At operation 506, a consumer account installs an application instance in the consumer account. The application instance may include APIs and corresponding (non-visible) underlying code in the application in the provider account.

At operation 508, the application instance creates one or more specification objects within the application instance installed in the consumer account. The one or more specification objects correspond to the one or more security type privileges provided in the application.

At operation 510, the application instance may create one or more account level objects corresponding to the one or more specification objects in the consumer account. The account level objects are gated by the respective application specifications and are effectively non-functional until the corresponding application specification has been approved by the consumer.

At operation 512, the one or more specification objects request approval from the consumer. For example, a prompt may be displayed on a user interface requesting grant of the security privileges in the one or more specification objects.

At operation 514, in response to receiving approval, the system enables the one or more account-level objects to allow the application to perform the corresponding functionality. For example, approval of an EAI application specification allows the application to use the associated EAI.

Application specification enforcement may be performed at the account level object, such as the EAIs. Enforcement at the account level object ensures that the specification is enforced irrespective of the operation that uses the account level object. Application specifications may be enforced only on objects that were created by the application. For example, with the enforcement of application specifications, an application can use the account level object (e.g., EAI) if the same application created the account level object (e.g.,) the application is the owner as well as the creator of the EAI), and the account level object has a list of allowed network rules also created by the application. For example, network rules cannot be used by objects other than EAIs owned by the same application.

Figure 6:
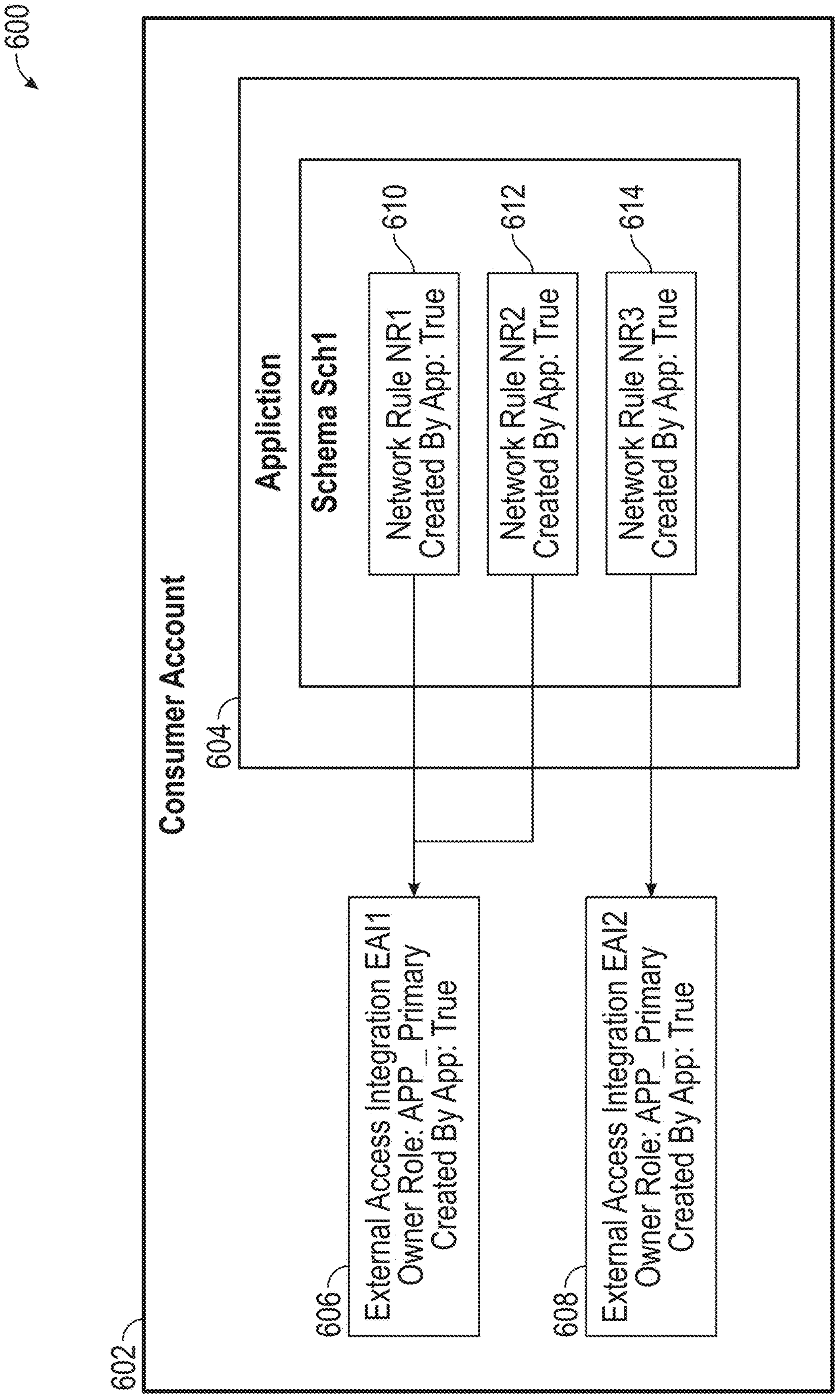
FIG. 6 depicts an example of a framework 600 for application specification enforcement, according to some example embodiments.

FIG. 6 depicts an example of a framework 600 for application specification enforcement, according to some example embodiments. The framework 600 is for a consumer account 602. The consumer account 602 includes an application instance 604 (also referred to as application), which was installed in the consumer account with one or more application specifications, as described herein. The consumer account 602 also includes an EAI1 606 and EAI2 608, which were created by application 604. As shown, EAI1 606 includes a field indicating that the owner of EAI1 606 is the application 604 (ownerRole: APP_PRIMARY) and another field showing that EAI1 606 was created by the application 604 (createdByApp: true). Similarly, EAI2 608 includes a field indicating that the owner of EAI2 608 is the application 604 (ownerRole: APP_PRIMARY) and another field showing that EAI2 608 was created by the application 604 (createdByApp: true).

The application 604 includes network rule 1 (NR1) 610, NR2 612, and NR3 614. NR1 610 and NR2 612 are coupled to EAI1 606. NR3 614 is coupled to EAI2 608. Each of the NRs 610, 612, 614 include a field indicating that they were created by the application 604 (createdByApp: true).

At runtime, when an EAI (e.g., EAI2 608) is used for performing egress with any operation, a corresponding network rule (e.g., NR3 614 for EAI2 608) is used to fetch host port values. The platform may check if the corresponding EAI and network rule were created by the application. The platform may then filter the list of host port values in accordance with the respective application specification. For example, the host port value may be compared to the approved port values in the application specifications. The approved specifications may be stored, for example, in a metadata database and may be fetched from there. If the host port values match with the approved port values in the application specification, the egress operation may proceed. However, if the host port values do not match with the approved port values, the egress operation may be disallowed and terminated.

As mentioned above, application specifications may be updated or altered. Sequence numbers are used to track different versions of the application specifications. The sequence number may be used to identify each request sequence/version and avoid race conditions.

FIGS. 7A-7B show an example portion of a lifecycle of an application specification, according to some example embodiments. The fields in this example application specification include a name field (e.g., "foo"), type field (e.g., external access), sequence number field, status field, and definition field.

At t1, the application specification is created as an external access type with a sequence number 1. The definition indicates that the application wants the privilege for egress to host port 'v1'. The status is pending.

At t2, the consumer approves application specification with sequence number 1. Hence, the status has changed to approved and the use of host port 'v1' takes effect.

At t3, the application alters the specification by creating sequence number 2, which changes the host port to 'v2'. The status of sequence number 2 is pending. Sequence number 1 is still in approved state and in effect. Hence, there are two sequence numbers visible to the consumer: sequence number 1 (host port 'v1'), which is approved, and sequence number 2 (host port 'v2'), which is pending.

At t4, the application alters the specification again by replacing sequence number 2 with sequence number 3 changing the host port to 'v3'. Now sequence number 3 is in pending state, and sequence number 2 has been removed. Only one sequence number can be in a pending state to show only the latest requested definition. Likewise, only one sequence number can be in an approved state at a time. At t4, there are two sequence numbers visible to the consumer: sequence number 1 (host port 'v1'), which is approved, and sequence number 3 (host port 'v3'), which is pending.

At t5, the consumer declines sequence number 1 of the specification, which was previously approved and in effect. Consumer takes no action with respect to sequence number 3, which stays in pending state. No sequence number is in an approved state and thus the specification is not in effect. Operations trying to use the account level object (e.g., EAI) may not be performed because the consumer has revoked the approval.

At t6, the application alters the specification by replacing sequence 3 with sequence 4 changing the host port to 'v4'. The sequence number 4 is in pending state, and sequence number 3 has been removed. Sequence number 4 is now only visible to the consumer. No sequence number is in an approved state and thus the specification is not in effect.

At t7, the application alters the specification by replacing sequence 4 with sequence 5 changing the host port to 'v5'. The sequence number 5 is in pending state, and sequence number 4 has been removed. Sequence number 5 is now only visible to the consumer. No sequence number is in an approved state and thus the specification is not in effect.

At t8, the consumer approves application specification with sequence number 5. Hence, the status of sequence number 5 changes to approved and the use of host port 'v5' takes effect.

Figure 8:
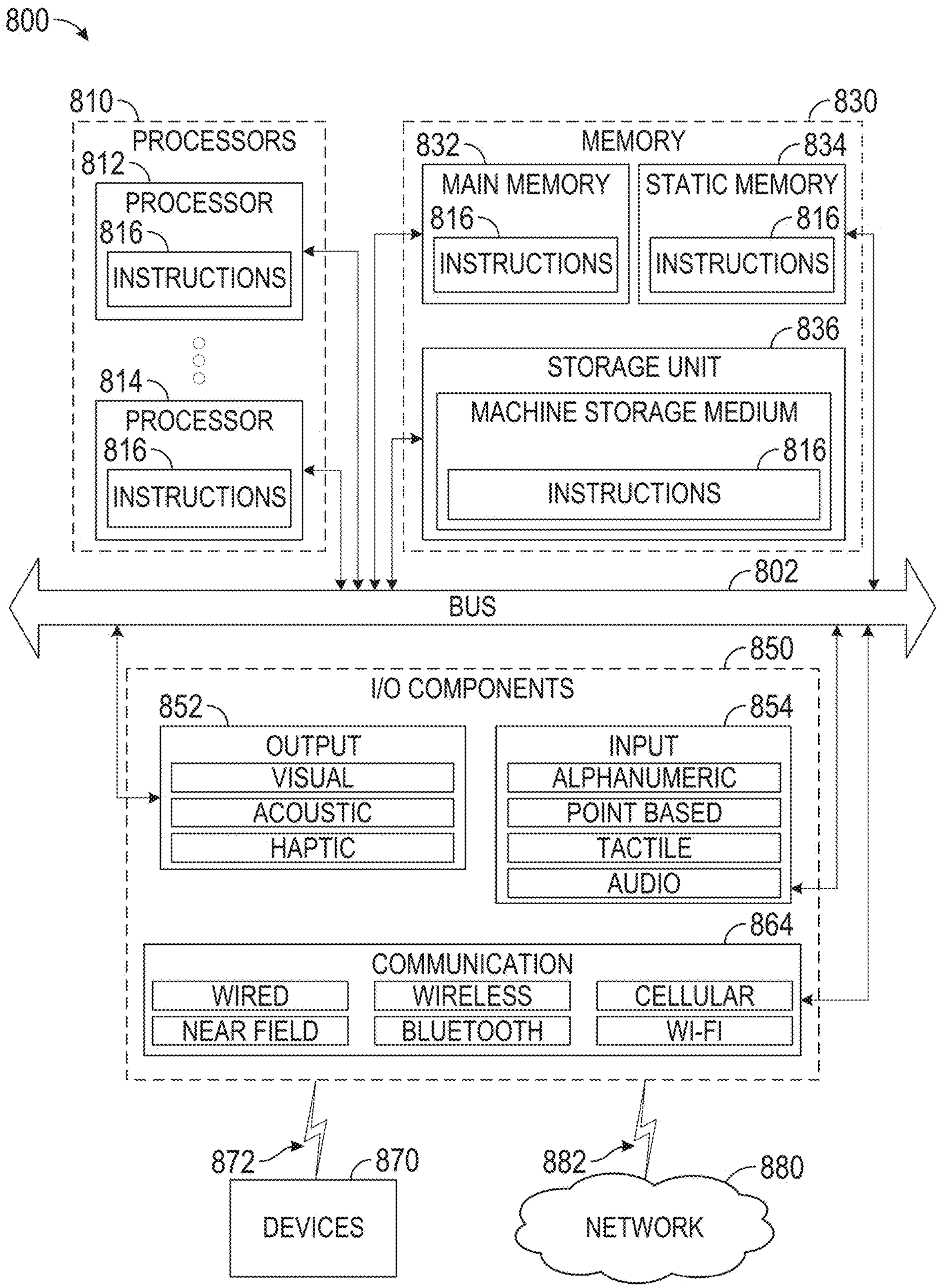
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., a software, a program, an application, an applet, an app, or other executable code) for causing the machine 800 to perform any one or more of the methodologies discussed herein may be executed. For example, the instructions 816 may cause the machine 800 to execute any one or more operations of the methods described herein. As another example, the instructions 816 may cause the machine 800 to implement any one or more portions of the functionality illustrated in any one of figures described herein. In this way, the instructions 816 transform a general, non-programmed machine into a particular machine that is specially configured to carry out any one of the described and illustrated functions of the cloud data platform 102 such as the compute service manager 108 (or a component thereof such as the application specification manager 109) or an execution node of the execution platform 110.

In some embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and I/O components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 814 and a processor 812 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include the data store 206 or any other computing device described herein as being in communication with the cloud data platform 102 or the data storage 104.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage medium and transmission medium. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: installing an application instance in a consumer account of a multi-tenant network-based data system, the application instance corresponding to an application shared by a provider account of the multi-tenant network-based data system; creating a specification object in the application instance in the consumer account, the specification object comprising a privilege request for an egress operation by the application instance; creating an account-level object corresponding to the egress operation, the account-level object being gated by the specification object; and based on receiving approval the privilege request from the consumer account, enabling the account-level object to perform the egress operation.

Example 2. The method of example 1, wherein the account-level object includes an integration.

Example 3. The method of any of examples 1-2, further comprising: comparing a port value of the integration with a list of approved port values from the specification object; and performing the egress operation based on matching the port value in the list of approved port values from the specification object.

Example 4. The method of any of examples 1-3, wherein the integration is coupled to a network rule, the operations further comprising: determining that the integration was created by the application instance; and determining that the network rule was created by the application instance.

Example 5. The method of any of examples 1-4, wherein the specification object comprises a sequence number field, and wherein each new version of the privilege request receives a new sequence number in the sequence number field.

Example 6. The method of any of examples 1-5, wherein the specification object comprises a status field for each sequence number.

Example 7. The method of any of examples 1-6, wherein only a single sequence number can be in an approved status at a time.

Example 8. The method of any of examples 1-7, wherein only a single sequence number can be in a pending status at a time.

Example 9. The method of any of examples 1-8, wherein the privilege request is for external access integration.

Example 10. The method of any of examples 1-9, wherein the account-level object is non-functional without consumer account approval.

Example 11. A system comprising: one or more processors of a machine; and a memory storing instructions that, when executed by the one or more processors, cause the machine to perform operations implementing any one of example methods 1 to 10.

Example 12. A machine-storage medium embodying instructions that, when executed by a machine, cause the machine to perform operations implementing any one of example methods 1 to 10.

What is claimed is:

1. A system comprising:

at least one hardware processor; and at least one memory storing instructions that cause the at least one hardware processor to perform operations comprising:

installing an application instance in a consumer account of a multi-tenant network-based data system, the application instance corresponding to an application shared by a provider account of the multi-tenant network-based data system;

creating a specification object in the application instance in the consumer account, the specification object comprising a privilege request for an egress operation by the application instance;

creating an account-level object corresponding to the egress operation, the account-level object being gated by the specification object; and based on receiving approval the privilege request from the consumer account, enabling the account-level object to perform the egress operation.

2. The system of claim 1, wherein the account-level object includes an integration.

3. The system of claim 2, the operations further comprising:

comparing a port value of the integration with a list of approved port values from the specification object; and performing the egress operation based on matching the port value in the list of approved port values from the specification object.

4. The system of claim 2, wherein the integration is coupled to a network rule, the operations further comprising:

determining that the integration was created by the application instance; and determining that the network rule was created by the application instance.

5. The system of claim 1, wherein the specification object comprises a sequence number field, and wherein each new version of the privilege request receives a new sequence number in the sequence number field.

6. The system of claim 5, wherein the specification object comprises a status field for each sequence number.

7. The system of claim 6, wherein only a single sequence number can be in an approved status at a time.

8. The system of claim 6, wherein only a single sequence number can be in a pending status at a time.

9. The system of claim 1, wherein the privilege request is for external access integration.

10. The system of claim 1, wherein the account-level object is non-functional without consumer account approval.

11. A method comprising:

installing an application instance in a consumer account of a multi-tenant network-based data system, the application instance corresponding to an application shared by a provider account of the multi-tenant network-based data system;

creating a specification object in the application instance in the consumer account, the specification object comprising a privilege request for an egress operation by the application instance;

creating an account-level object corresponding to the egress operation, the account-level object being gated by the specification object; and based on receiving approval the privilege request from the consumer account, enabling the account-level object to perform the egress operation.

12. The method of claim 11, wherein the account-level object includes an integration.

13. The method of claim 12, further comprising:

comparing a port value of the integration with a list of approved port values from the specification object; and performing the egress operation based on matching the port value in the list of approved port values from the specification object.

14. The method of claim 12, wherein the integration is coupled to a network rule, the operations further comprising:

determining that the integration was created by the application instance; and determining that the network rule was created by the application instance.

15. The method of claim 11, wherein the specification object comprises a sequence number field, and wherein each new version of the privilege request receives a new sequence number in the sequence number field.

16. The method of claim 15, wherein the specification object comprises a status field for each sequence number.

17. The method of claim 16, wherein only a single sequence number can be in an approved status at a time.

18. The method of claim 16, wherein only a single sequence number can be in a pending status at a time.

19. The method of claim 11, wherein the privilege request is for external access integration.

20. The method of claim 11, wherein the account-level object is non-functional without consumer account approval.

21. A computer-storage medium comprising instructions that, when executed by one or more processors of a machine, configure the machine to perform operations comprising:

installing an application instance in a consumer account of a multi-tenant network-based data system, the application instance corresponding to an application shared by a provider account of the multi-tenant network-based data system;

creating a specification object in the application instance in the consumer account, the specification object comprising a privilege request for an egress operation by the application instance;

creating an account-level object corresponding to the egress operation, the account-level object being gated by the specification object; and based on receiving approval the privilege request from the consumer account, enabling the account-level object to perform the egress operation.

22. The computer-storage medium of claim 21, wherein the account-level object includes an integration.

23. The computer-storage medium of claim 22, the operations further comprising:

comparing a port value of the integration with a list of approved port values from the specification object; and performing the egress operation based on matching the port value in the list of approved port values from the specification object.

24. The computer-storage medium of claim 22, wherein the integration is coupled to a network rule, the operations further comprising:

determining that the integration was created by the application instance; and determining that the network rule was created by the application instance.

25. The computer-storage medium of claim 21, wherein the specification object comprises a sequence number field, and wherein each new version of the privilege request receives a new sequence number in the sequence number field.

26. The computer-storage medium of claim 25, wherein the specification object comprises a status field for each sequence number.

27. The computer-storage medium of claim 26, wherein only a single sequence number can be in an approved status at a time.

28. The computer-storage medium of claim 26, wherein only a single sequence number can be in a pending status at a time.

29. The computer-storage medium of claim 21, wherein the privilege request is for external access integration.

30. The computer-storage medium of claim 21, wherein the account-level object is non-functional without consumer account approval.

* * * * *